June 3, 1930.  C. F. HINE  1,761,627
MATERIAL CLASSIFIER
Filed March 6, 1928
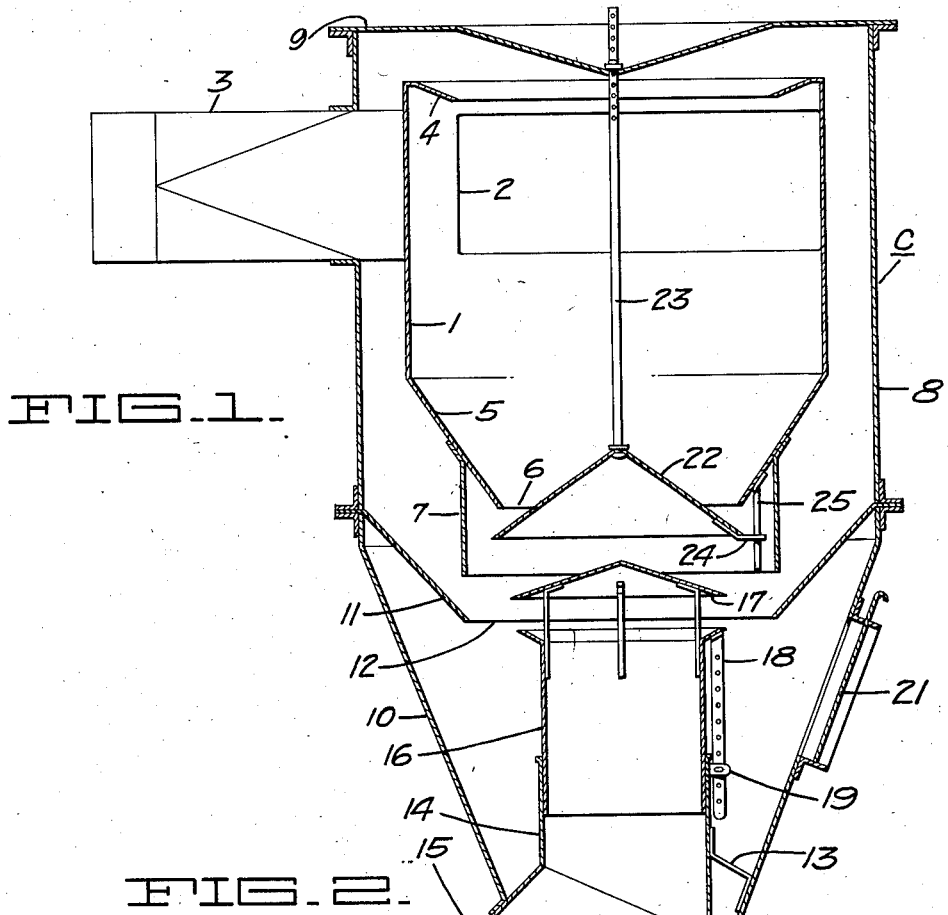
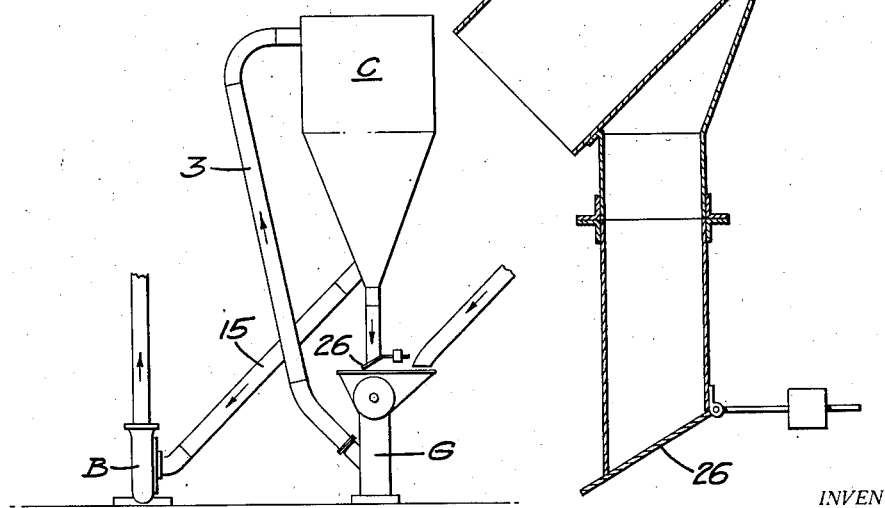
INVENTOR
Charles F. Hine
BY White, Prost & Fryer
ATTORNEYS Patented June 3, 1930

1,761,627

UNITED STATES PATENT OFFICE

CHARLES F. HINE, OF SAN FRANCISCO, CALIFORNIA

MATERIAL CLASSIFIER

Application filed March 6, 1928. Serial No. 259,400.

This invention relates to that class of apparatus or system whereby materials are first ground and then the resulting particles are classified or selectively separated according to their weight or state of subdivision or size.

A great many of the processes now in use depend on the fact that the particles of material of a given size and specific gravity are held in suspension by a current of air of a definite velocity, and by varying the velocity of the air the various grades of material can be separated and deposited where required.

In general it is the object of this invention to provide a system and apparatus whereby the raw material to be classified is first ground and then conveyed by means of a vehicular fluid to the classifier or selective separator wherein the subdivided particles of material to be classified are separated from the vehicular fluid and caused to drop in the form of a cylindrical curtain, the separated fluid then being caused to pass thru the curtain of subdivided particles thereby deflecting these particles in proportion to their weight or size. The particles deflected thru any predetermined range may then be selectively collected and separated from the remaining particles. The particles least deflected are usually the largest and heaviest and therefore if it is desired these particles may be again passed thru the cycle until all of them have been ground and classified to any predetermined size or weight.

Another object of this invention is the provision of a material classifier in which the vehicular fluid used to convey the subdivided particles to the classifier may be separated from the subdivided particles and when so separated used as the deflecting medium for deflecting the subdivided particles from a curtain of such particles which are under the influence of the gravitational field.

The invention possesses other advantageous features, some of which with the foregoing will be set forth at length in the following description where I shall outline in full that form of my invention which I have selected for illustration in the drawings accompanying and forming part of the present specification. In said drawings I have shown one form of my invention, but it is to be understood that I do not limit myself to such form, since the invention as set forth in the claims, may be embodied in a plurality of forms.

Referring to the drawings:

Fig. 1 is a diagrammatic transverse sectional view of the classifier of my invention.

Fig. 2 is a diagrammatic representation of the system of which the classifier shown in Fig. 1 forms a part.

The classifier of my invention generally designated as C comprises a cyclone separator 1 provided with a lateral opening 2 at its upper end which communicates with a conduit 3. The upper end of the cyclone separator is provided with an inwardly and downwardly extending annular lip 4. Its lower end 5 is conical in form and is provided with a central circular opening 6. Depending from and supported by the lower conical end 5 of the separator 1 is a cylindrical skirt 7.

Surrounding the separator 1 and spaced therefrom is an outer cylindrical casing 8 having a lateral opening for accommodating the conduit 3 and provided with a centrally depressed circular cap or cover 9. A funnel shaped member 10 depends from and forms a continuation of the cylindrical housing 8. Intermediate the housing 8 and funnel 10 is an inwardly and downwardly extending frustrated conical skirt 11 provided with a central circular opening 12. Supported from the walls of the funnel member 10 by brackets 13 is a sheet metal elbow 14, the lower end 15 of which passes thru an opening in the walls of the funnel 10. Adjustably telescoped within the upper end of the elbow 14 is a stack or conduit 16, the upper end of which is covered by a spaced cap 17. The longitudinal adjustment of the stack or conduit 16 may be obtained by any suitable means such as an apertured strip 18 secured thereto and cooperating with an apertured lug 19 secured to the elbow 14. Any desired aperture in the strip 18 may be placed in registration with the aperture in the lug 19 and a pin passed therethru. A suitably closed man hole 21 may be provided in the funnel 10 for making any necessary adjustments therein.

A conical plate 22 secured to a rod 23 adjustably restricts the opening 6 of the separator 1. The upper end of the rod 23 is apertured and passes thru an opening in the cover 9. Longitudinal adjustability of the conical member or plate 22 is secured by passing a pin thru any one of the apertures in the upper end of the rod 23, above the cover 9. Notched lugs or ears 24 are secured to the periphery of the conical plate 22 and are made to straddle cooperating guide members 25 secured to the lower conical walls 5 of the separator 1. The lower end of the funnel member 10, or a continuation thereof is provided with a balanced, hinged gate 26.

As shown in Fig. 2, the classifier C above described is placed in a system intermediate a grinder G and a blower B. The raw material to be ground and classified is introduced into the grinder G by any suitable conveyor. From the grinder G it is conveyed thru the conduit 3 by means of any suitable vehicular fluid to the classifier C where it is selectively separated or classified. The finished product is drawn out thru the conduit 15 while the coarser material collects at the lower end of the classifier and is returned by means of the gate 26 to the grinder G. The necessary fluid current for the entire operation is furnished by the blower B.

The operation of the classifier per se is as follows:

The material laden fluid conveyed thru the conduit 3 is introduced tangentially within the cyclone separator 1 where a separating action takes place. The material laden fluid on entering the separator is constrained to follow a circular path. The area of the separator being much greater than that of the inlet pipe, the velocity of the fluid is reduced until it is below that necessary to support the material, which is being thrown outwards at the same time by the centrifugal force and it consequently falls down the sides of the conical portion of the separator, from which it passes onto the conical plate 22. From the plate 22 the material falls in a cylindrical curtain surrounding the stack or conduit 16 and its cap or cover 17. The motion of each particle as it leaves the conical plate 22 is not entirely vertical for thru the action of the cyclone separator it has acquired a vortical motion, some of which it still retains. In the meantime the vehicular fluid freed by the action of the separator from the material which it has carried, passes upwardly thru the central opening in the separator and then downwardly within the cylindrical space formed by the housing 8 and the walls of the separator 1. The skirts 7 and 11 form in effect a nozzle of restricted annular opening which increases the velocity of the fluid passing down within the space formed by the cylindrical housing 8 and the separator 1. It should be remembered that during the entire process or cycle the blower B tends to maintain a vacuum, as best shown in Fig. 2, within the stack or conduit 16. The vacuum so produced forms a conical fluid current passing from the annular nozzle above described, to the upper open end of the stack or conduit 16. By decreasing the annular opening between the skirts 7 and 11 the velocity of the conical current of fluid may be increased as desired. By adjusting the longitudinal position or height of the stack 16, the solid angle determined by the conical fluid current may be increased or decreased at will. The conical fluid current therefore passes or cuts the path of the cylindrical curtain of material to be classified. These particles are then in effect being subjected to two independent fields of force, the gravitational field and the conical fluid current field. As is well known and understood the amount of deflection of each particle caused by the conical field is proportional to its weight or size. With the stack 16 in the position shown in Fig. 1, the velocity of the conical field could be so adjusted that only the smallest and lightest particles would be deflected sufficiently to enter the space between the top of the stack 16 and its cover or cap 17. By lowering the stack 16 the lightest particles would still be drawn within the stack and also heavier particles, which in the first position of the stack could not have entered therein. With the stack in its lowermost position, all of these particles except the heaviest would enter. Thus it may be seen that by adjusting the stack longitudinally, the limits or range of variation of sizes or weights of the particles classified may be controlled. Practically all the material may be made to enter the stack 16 or only the very lightest particles. The particles not sufficiently deflected to enter the stack 16 fall to the lower portion of the funnel 10 and as this material accumulates on the door or gate 26, its weight is finally sufficient to open the gate and allow it to pass back into the grinder G. The cycle is then repeated.

The opening 6 at the lower end of the separator 1 may be so restricted by the longitudinal adjustment of the conical plate 22, that only solid particles can pass therethru; the vehicular fluid therefore being made to pass upwardly in order to escape. The operation of the gate 26 is such as to always maintain a certain amount of material above it thus keeping the end of the funnel 10 closed and thereby maintaining a partial vacuum within the funnel 10 and stack 16.

From the above disclosure it may be seen that I have provided a system of material classification whereby a fluid vehicle is first used to convey the material to be classified to the classifying mechanism where it is separated out from the subdivided solid particles of such material. The vehicular fluid so separated is then used to effect the classification of the subdivided solid particles and then to convey away a portion of such material having predetermined characteristics such as size or weight as a finished product. Where the particles making up the material are graded in size from a maximum to a minimum, this system enables me to conveniently exclude or separate out all the particles over and above any predetermined size or weight. The device is automatic and extremely simple of construction and operation in that no moving parts are used other than the blower and in that it requires very little servicing or maintenance. The vehicular fluid used may be any desirable elastic fluid or gas. Its travel thru the mechanism is continuous and during its travel it performs three distinct functions as above set forth.

I claim:

1. The method of classifying a subdivided solid material conveyed in a vehicular fluid comprising conveying said material in the fluid, substantially separating said material from said fluid, dispersing said separated material, classifying said dispersed material in conjunction with said separated fluid, and receiving said separated fluid carrying a portion of said classified material.

2. A material classifier comprising means for introducing a subdivided material laden fluid to the classifier, means for causing the laden fluid to traverse a substantially circular path to free it substantially of the material, means for directing material freed from the fluid to fall in a curtain, and means for deflecting the material freed fluid across the curtain of material to reentrain a predetermined portion thereof in the fluid.

3. A material classifier comprising a chamber, fluid conveying means placed tangentially to said chamber so that fluid introduced therein whirls about the chamber, a portion of said chamber converging to be of lesser extent away from the fluid conveying means, material deflecting means adjacent said converging chamber portion, a second chamber extending about the first named chamber, the second chamber being spaced from the first chamber to provide a fluid passage, means for deflecting fluid passing thru the passage between the first and second chamber against material falling from the material deflecting means, a conduit for receiving the fluid deflected against the material and the material entrained in said fluid, and a second material deflecting means positioned across the conduit adjacent the fluid deflecting means and the first named material deflecting means.

4. A material classifier comprising a chamber, fluid conveying means placed tangentially to said chamber so that fluid introduced therein whirls about the chamber tangentially, a portion of said chamber converging axially of the chamber to be of lesser extent away from the fluid conveying means, material deflecting means adjacent said converging chamber portion, a second chamber extending about the first named chamber, the second chamber being spaced from the first chamber to provide a fluid passage, means for deflecting fluid passing thru the passage between the first and second chamber against material falling from the material deflecting means, a conduit for receiving the fluid deflected against the material and the material entrained in said fluid, said conduit extending axially of the first named chamber and opening adjacent to the fluid deflecting and material deflecting means, and a second material deflecting means positioned across the conduit adjacent the fluid deflecting means and the first named material deflecting means.

In testimony whereof, I have hereunto set my hand.

CHARLES F. HINE.